(12) United States Patent
Chen et al.

(10) Patent No.: US 12,352,347 B2
(45) Date of Patent: Jul. 8, 2025

(54) EXTERNAL MESHING CYLINDRICAL GEAR PAIR WITH CONSTANT MESHING CHARACTERISTICS CONSTRUCTED TOOTH PAIR

(71) Applicants: Chongqing University, Chongqing (CN); Chongqing Yisilun Technology Co., Ltd., Chongqing (CN)

(72) Inventors: Bingkui Chen, Chongqing (CN); Zhongtao Li, Chongqing (CN); Luhe Zhang, Chongqing (CN); Wenjun Luo, Chongqing (CN); Yonghong Chen, Chongqing (CN); Chaoyang Li, Chongqing (CN); Changyan Peng, Chongqing (CN)

(73) Assignees: Chongqing University, Chongqing (CN); Chongqing Yisilun Technology Co., Ltd., Chongqing (CN)

( * ) Notice: Subject to any disclaimer, the term of this patent is extended or adjusted under 35 U.S.C. 154(b) by 0 days.

(21) Appl. No.: 18/653,586

(22) Filed: May 2, 2024

(65) Prior Publication Data

US 2024/0401686 A1 Dec. 5, 2024

(30) Foreign Application Priority Data

May 31, 2023 (CN) .......................... 202310633084.1

(51) Int. Cl.
*F16H 55/17* (2006.01)
*F16H 55/08* (2006.01)

(52) U.S. Cl.
CPC ........... *F16H 55/17* (2013.01); *F16H 55/088* (2013.01)

(58) Field of Classification Search
CPC .. F16H 55/17; F16H 55/088; F16H 2055/086; F16H 2055/0866; F16H 2055/0893; F16H 55/08
See application file for complete search history.

(56) References Cited

U.S. PATENT DOCUMENTS

| | | | |
|---|---|---|---|
| 2024/0401673 A1* | 12/2024 | Chen | F16H 1/34 |
| 2024/0401684 A1* | 12/2024 | Chen | F16H 1/08 |
| 2024/0401685 A1* | 12/2024 | Zhang | F16H 55/08 |

FOREIGN PATENT DOCUMENTS

| | | |
|---|---|---|
| CN | 105202115 A | 12/2015 |
| CN | 110081148 A | 8/2019 |

* cited by examiner

*Primary Examiner* — Terence Boes
(74) *Attorney, Agent, or Firm* — CM Law PLLC; Robert C. Klinger

(57) ABSTRACT

Provided is an external meshing cylindrical gear pair with a constant meshing characteristics constructed tooth pair. The external meshing cylindrical gear pair with a constructed tooth pair includes a cylindrical gear I with a constructed tooth pair and a cylindrical gear II with a constructed tooth pair based on conjugate curves. In the present disclosure, normal tooth profile curves of the cylindrical gear I with a constructed tooth pair and the cylindrical gear II with a constructed tooth pair are continuous combined curves with the same curve shape, which facilitates machining by the same cutter. A common normal at an inflection point or a tangent point of the continuous combined curve passes through a pitch point of the gear pair, and a position of the inflection point or the tangent point can be adjusted according to an actual demand. A contact ratio is designed as an integer.

20 Claims, 5 Drawing Sheets

US 12,352,347 B2

EXTERNAL MESHING CYLINDRICAL GEAR PAIR WITH CONSTANT MESHING CHARACTERISTICS CONSTRUCTED TOOTH PAIR

CROSS REFERENCE TO RELATED APPLICATION

This patent application claims the benefit and priority of Chinese Patent Application No. 202310633084.1, filed with the China National Intellectual Property Administration on May 31, 2023, the disclosure of which is incorporated by reference herein in its entirety as part of the present application.

TECHNICAL FIELD

The present disclosure relates to the technical field of gear transmission, relates to an external meshing cylindrical gear pair with a constant meshing characteristics constructed tooth pair, and in particular, to an external meshing cylindrical gear pair with a constructed tooth pair that is formed by a cylindrical gear I with a constructed tooth pair and a cylindrical gear II with a constructed tooth pair as a pair, and has the same normal tooth profile, a constant curvature radius at a meshing point that tends to infinity, a constant sliding ratio, and a constant meshing stiffness.

BACKGROUND

An external meshing cylindrical gear pair as one of main forms of mechanical transmission functions to change a direction of mechanical rotation and transmit power, and decelerate to increase a torque or accelerate to reduce the torque, and is widely used in the fields of high-end equipment, aerospace, precision instruments, and the like. Most of existing external meshing cylindrical gear pairs are involute gear pairs, which have problems such as large sliding ratio between tooth surfaces and time-varying meshing stiffness, leading to reduction of transmission efficiency, service life and dynamic meshing performance, and the like of the external meshing cylindrical gear pairs. With the development of science and technology and the popularization in application scenarios, it is difficult for the conventional external meshing cylindrical gear pairs to meet high performance requirements in the fields of national defense technology, industrial manufacturing, production and life, and the like.

The patent No. CN105202115 A discloses a multi-point contact meshing cylindrical gear pair based on conjugate curves, which is formed by a convex-tooth gear and a concave-tooth gear in mutual multi-point meshing. A pair of gears with concave and convex tooth profiles in the gear pair need machining by means of different cutters, which increases a manufacturing cost of the gear pair. The concave and convex tooth profiles lead to a limited curvature radius at a meshing point of the gear pair, thereby limiting further improvement of the bearing capacity of the gear pair. With regard to selection of contact points, tooth surface interference occurs at pitch points, making it difficult to achieve a zero sliding ratio. The patent No. CN110081148 A discloses gears with a constructed tooth pair having convex-convex contact based on conjugate curves, including a first gear and a second gear with convex-convex meshing point contact as a pair. Tooth surfaces of the first gear and the second gear are single-parameter sphere family envelope surfaces, which leads to a limited curvature radius at a meshing point of the gear pair, thereby also limiting the bearing capacity of the gear pair. A contact ratio of the gear pair is uncertain, and the meshing stiffness is time-varying, thereby intensifying vibration noise of the gear pair. Therefore, there is an urgent need for an innovative tooth profile design based on an existing design theory of gears with a constructed tooth pair having conjugate curves, so as to improve meshing performance of an external meshing cylindrical gear pair with a constructed tooth pair and reduce production and manufacturing costs of the gear pair.

SUMMARY

The present disclosure provides an external meshing cylindrical gear pair with a constant meshing characteristics constructed tooth pair. The gear pair is formed by a cylindrical gear I with a constructed tooth pair and a cylindrical gear II with a constructed tooth pair that have the same normal tooth profile, with a constant curvature radius at a meshing point that tends to infinity, a constant sliding ratio, and a constant meshing stiffness, and technically features low manufacturing cost, high bearing capacity, high transmission efficiency, low vibration noise, and the like.

To achieve the above objective, the present disclosure provides the following technical solutions.

The present disclosure provides an external meshing cylindrical gear pair with a constant meshing characteristics constructed tooth pair, including a cylindrical gear I with a constructed tooth pair and a cylindrical gear II with a constructed tooth pair as a pair based on conjugate curves, where a normal tooth profile curve $\Gamma_{s1}$ of the cylindrical gear I with a constructed tooth pair and a normal tooth profile curve $\Gamma_{s2}$ of the cylindrical gear II with a constructed tooth pair are continuous combined curves $\Gamma_L$ with the same curve shape, and the continuous combined curve $\Gamma_L$ is a combined curve $\Gamma_{L1}$ of an odd power function curve and a tangent at an inflection point thereof, a combined curve $\Gamma_{L2}$ of a sine function curve and a tangent at an inflection point thereof, a combined curve $\Gamma_{L3}$ of an epicycloid function curve and a tangent at an inflection point thereof, a combined curve $\Gamma_{L4}$ of an odd power function, a combined curve $\Gamma_{L5}$ of a sine function, or a combined curve $\Gamma_{L6}$ of an epicycloid function; the continuous combined curve $\Gamma_L$ is formed by two continuous curves, a connection point of the two continuous curves is an inflection point or a tangent point of the continuous combined curve $\Gamma_L$, and the inflection point or the tangent point of the continuous combined curve $\Gamma_L$ is a designated point located on a meshing force action line of the external meshing cylindrical gear pair with a constant meshing characteristics constructed tooth pair; the normal tooth profile curve $\Gamma_{s1}$ of the cylindrical gear I with a constructed tooth pair is swept along given conjugate curves to obtain a tooth surface of the cylindrical gear I with a constructed tooth pair, and the normal tooth profile curve $\Gamma_{s2}$ of the cylindrical gear II with a constructed tooth pair is swept along the given conjugate curves to obtain a tooth surface of the cylindrical gear II with a constructed tooth pair.

Preferably, when the continuous combined curve $\Gamma_L$ is the combined curve $\Gamma_{L1}$ of the odd power function curve and the tangent at the inflection point thereof, the continuous combined curve $\Gamma_L$ includes an odd power function curve $\Gamma_{L12}$ and a tangent $\Gamma_{L11}$ at an inflection point of the odd power function curve; a rectangular coordinate system is established at the tangent point of the continuous combined curve $\Gamma_L$, and an equation of the combined curve $\Gamma_{L1}$ of the odd power function curve and the tangent at the inflection point thereof is as follows:

$$\begin{cases} \Gamma_{L11}: x_{10} = t, y_{10} = 0 & (t_1 \le t < 0) \\ \Gamma_{L12}: x_{10} = t, y_{10} = At^{2n-1} & (0 \le t \le t_2) \end{cases}$$

where $x_{10}$ and $y_{10}$ are x-axis and y-axis coordinate values of the continuous combined curve $\Gamma_L$ in the rectangular coordinate system, respectively; a parameter t is an independent variable of the equation; $t_1$ and $t_2$ are value ranges of the continuous combined curve $\Gamma_L$; A is a coefficient of the equation; and n is a degree of the independent variable and is a positive integer.

Preferably, when the continuous combined curve $\Gamma_L$ is the combined curve $\Gamma_{L2}$ of the sine function curve and the tangent at the inflection point thereof, the continuous combined curve $\Gamma_L$ includes a sine function curve $\Gamma_{L22}$ and a tangent $\Gamma_{L21}$ at an inflection point of the sine function curve; a rectangular coordinate system is established at the tangent point of the continuous combined curve $\Gamma_L$, and an equation of the combined curve $\Gamma_{L2}$ of the sine function curve and the tangent at the inflection point thereof is as follows:

$$\begin{cases} \Gamma_{L21}: x_{20} = t, y_{20} = kt & (t_1 \le t < 0) \\ \Gamma_{L22}: x_{20} = t, y_{20} = A\sin(Bt) & (0 \le t \le t_2) \end{cases}$$

where $x_{20}$ and $y_{20}$ are x-axis and y-axis coordinate values of the continuous combined curve $\Gamma_L$ in the rectangular coordinate system, respectively; a parameter t is an independent variable of the equation; $t_1$ and $t_2$ are value ranges of the continuous combined curve $\Gamma_L$; k is a slope of the tangent $\Gamma_{L21}$ at the inflection point of the sine function curve; and A and B are coefficients of the equation.

Preferably, when the continuous combined curve $\Gamma_L$ is the combined curve $\Gamma_{L3}$ of the epicycloid function curve and the tangent at the inflection point thereof, the continuous combined curve $\Gamma_L$ includes an epicycloid function curve $\Gamma_{L32}$ and a tangent $\Gamma_{L31}$ at an inflection point of the epicycloid function curve; a rectangular coordinate system is established at the tangent point of the continuous combined curve $\Gamma_L$, and an equation of the combined curve $\Gamma_{L3}$ of the epicycloid function curve and the tangent at the inflection point thereof is as follows:

$$\begin{cases} \Gamma_{L31}: x_{30} = t, y_{30} = kt & (t_1 \le t < 0) \\ \Gamma_{L32}: x_{30} = (R+r)\sin t - e\sin((R+r)t/r) & (0 \le t \le t_2) \\ \qquad y_{30} = (R+r)\cos t - e\cos((R+r)t/r) - (R+r-e) \end{cases}$$

where $x_{30}$ and $y_{30}$ are x-axis and y-axis coordinate values of the continuous combined curve $\Gamma_L$ in the rectangular coordinate system, respectively; a parameter t is an independent variable of the equation; $t_1$ and $t_2$ are value ranges of the continuous combined curve $\Gamma_L$; k is a slope of the tangent $\Gamma_{L31}$ at the inflection point of the epicycloid function curve; R is a radius of a cycloidal fixed circle; r is a radius of a moving circle; and e is an eccentric distance.

Preferably, when the continuous combined curve $\Gamma_L$ is the combined curve $\Gamma_{L4}$ of the odd power function, the continuous combined curve $\Gamma_L$ includes a first odd power function curve $\Gamma_{L41}$ and a second odd power function curve $\Gamma_{L42}$; a rectangular coordinate system is established at the inflection point of the continuous combined curve $\Gamma_L$, and an equation of the combined curve $\Gamma_{L4}$ of the odd power function is as follows:

$$\begin{cases} \Gamma_{L41}: x_{40} = t, y_{40} = At^{2n1-1} & (t_1 \le t < 0) \\ \Gamma_{L42}: x_{40} = t, y_{40} = Bt^{2n2-1} & (0 \le t \le t_2) \end{cases}$$

where $x_{40}$ and $y_{40}$ are x-axis and y-axis coordinate values of the continuous combined curve $\Gamma_L$ in the rectangular coordinate system, respectively; a parameter t is an independent variable of the equation; $t_1$ and $t_2$ are value ranges of the continuous combined curve $\Gamma_L$; A and B are coefficients of the equation; and n1 and n2 are degrees of the independent variable and are positive integers.

Preferably, when the continuous combined curve $\Gamma_L$ is the combined curve $\Gamma_{L5}$ of the sine function, the continuous combined curve $\Gamma_L$ includes a first sine function curve $\Gamma_{L51}$ and a second sine function curve $\Gamma_{L52}$; a rectangular coordinate system is established at the inflection point of the continuous combined curve $\Gamma_L$, and an equation of the combined curve $\Gamma_{L5}$ of the sine function is as follows:

$$\begin{cases} \Gamma_{L51}: x_{50} = t, y_{50} = A_1 \sin(B_1 t) & (t_1 \le t < 0) \\ \Gamma_{L52}: x_{50} = t, y_{50} = A_2 \sin(B_2 t) & (0 \le t \le t_2) \end{cases}$$

where $x_{50}$ and $y_{50}$ are x-axis and y-axis coordinate values of the continuous combined curve $\Gamma_L$ in the rectangular coordinate system, respectively; a parameter t is an independent variable of the equation; $t_1$ and $t_2$ are value ranges of the continuous combined curve $\Gamma_L$; and $A_1$, $B_1$, $A_2$ and $B_2$ are coefficients of the equation.

Preferably, when the continuous combined curve $\Gamma_L$ is the combined curve $\Gamma_{L6}$ of the epicycloid function, the continuous combined curve $\Gamma_L$ includes a first epicycloid function curve $\Gamma_{L61}$ and a second epicycloid function curve $\Gamma_{L62}$; a rectangular coordinate system is established at the inflection point of the continuous combined curve $\Gamma_L$, and an equation of the combined curve $\Gamma_{L6}$ of the epicycloid function is as follows:

$$\begin{cases} \Gamma_{L61}: x_{60} = -(R_1 + r_1)\sin t + e\sin((R_1+r_1)t/r_1) & (t_1 \le t < 0) \\ \qquad y_{60} = -(R_1+r_1)\cos t + e\cos((R_1+r_1)t/r_1) + \\ \qquad (R_1 + r_1 - e) \\ \Gamma_{L62}: x_{60} = (R_2 + r_2)\sin t - e\sin((R_2+r_2)t/r_2) & (0 \le t < t_2) \\ \qquad y_{60} = (R_2+r_2)\cos t - e\cos((R_2+r_2)t/r_2) - \\ \qquad (R_2 + r_2 - e) \end{cases}$$

where $x_{60}$ and $y_{60}$ are x-axis and y-axis coordinate values of the continuous combined curve $\Gamma_L$ in the rectangular coordinate system, respectively; a parameter t is an independent variable of the equation; $t_1$ and $t_2$ are value ranges of the continuous combined curve $\Gamma_L$; $R_1$, $r_1$, $R_2$ and $r_2$ are radii of a cycloidal moving circle and fixed circle, respectively; and e is an eccentric distance.

Preferably, a curve equation of the normal tooth profile curve $\Gamma_{s1}$ of the cylindrical gear I with a constructed tooth pair obtained by rotating the continuous combined curve $\Gamma_L$ around an origin of the rectangular coordinate system by an angle $\alpha_1$ is as follows:

$$\begin{cases} x_{01} = x_{n0} \cos\alpha_1 - y_{n0} \sin\alpha_1 \\ y_{01} = x_{n0} \sin\alpha_1 + y_{n0} \cos\alpha_1 \end{cases} (n = 1, 2, 3, 4, 5, 6)$$

where $x_{01}$ and $y_{01}$ are x-axis and y-axis coordinate values of the normal tooth profile curve of the cylindrical gear I with a constructed tooth pair in the rectangular coordinate system, respectively.

Preferably, a curve equation of the normal tooth profile curve $\Gamma_{s2}$ of the cylindrical gear II with a constructed tooth pair obtained by rotating the normal tooth profile curve $\Gamma s_1$ of the cylindrical gear I with a constructed tooth pair around the origin of the rectangular coordinate system by an angle of 180° is as follows:

$$\begin{cases} x_{02} = x_{01}\cos(180°) - y_{01}\sin(180°) \\ y_{02} = x_{01}\sin(180°) + y_{01}\cos(180°) \end{cases}$$

where $x_{02}$ and $y_{02}$ are x-axis and y-axis coordinate values of the normal tooth profile curve of the cylindrical gear II with a constructed tooth pair in the rectangular coordinate system, respectively.

Preferably, a tooth surface $\Sigma 1$ of the cylindrical gear I with a constructed tooth pair is obtained by sweeping the normal tooth profile curve $\Gamma_{s1}$ of the cylindrical gear I with a constructed tooth pair along a given helix, with a tooth surface equation as follows:

$$\begin{cases} x_{\Sigma 1} = x_{01}\cos\theta - y_{01}\cos\beta\sin\theta + r\cos\theta \\ y_{\Sigma 1} = x_{01}\sin\theta + y_{01}\cos\beta\cos\theta + r\sin\theta \\ z_{\Sigma 1} = r\theta\cot\beta - y_{01}\sin\beta \end{cases}$$

where $x_{\Sigma 1}$, $y_{\Sigma 1}$ and $z_{\Sigma 1}$ are coordinate values of the tooth surface of the cylindrical gear I with a constructed tooth pair, respectively; $\beta$ is a helix angle of the gear pair, $\theta$ is an angle of a given contact line, and r is a pitch radius of the cylindrical gear I with a constructed tooth pair.

Preferably, a tooth surface $\Sigma 2$ of the cylindrical gear II with a constructed tooth pair is obtained by sweeping the normal tooth profile curve $\Gamma_{s2}$ of the cylindrical gear II with a constructed tooth pair along a given helix, with a tooth surface equation as follows:

$$\begin{cases} x_{\Sigma 2} = x_{02}\cos\theta - y_{01}\cos\beta\sin\theta + (a-r)\cos\theta \\ y_{\Sigma 2} = x_{02}\sin\theta + y_{01}\cos\beta\cos\theta + (a-r)\sin\theta \\ z_{\Sigma 2} = (a-r)\theta\cot\beta - y_{02}\sin\beta \end{cases}$$

where $x_{\Sigma 2}$, $y_{\Sigma 2}$ and $z_{\Sigma 2}$ are coordinate values of the tooth surface of the cylindrical gear II with a constructed tooth pair, respectively; and a is a center distance of the external meshing cylindrical gear pair with a constructed tooth pair.

Preferably, a contact ratio of the external meshing cylindrical gear pair with a constant meshing characteristics constructed tooth pair is designed as an integer.

Compared with the prior art, the present disclosure has the following technical effects:

In the present disclosure, a cylindrical gear I with a constructed tooth pair and a cylindrical gear II with a constructed tooth pair have the same normal tooth profile, which can be machined by using the same cutter, thus reducing a manufacturing cost. A curvature radius at a meshing point is constant and tends to infinity, which improves the bearing capacity of the gear pair. A sliding ratio during meshing is constant and may be designed as a zero sliding ratio, which improves transmission efficiency of the gear pair and reduces wear during transmission. A contact ratio of the external meshing cylindrical gear pair with a constructed tooth pair is designed as an integer, which can achieve a constant meshing stiffness, thus greatly reducing vibration noise of the gear pair.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

In the figures: 1—Cylindrical gear I with a constructed tooth pair, 2—Cylindrical gear II with a constructed tooth pair.

DETAILED DESCRIPTION OF THE EMBODIMENTS

The technical solutions of the embodiments of the present disclosure are clearly and completely described below with reference to accompanying drawings in the embodiments of the present disclosure. Apparently, the described embodiments are merely some rather than all of the embodiments of the present disclosure. On the basis of the embodiments of the present disclosure, all other embodiments obtained by those of ordinary skill in the art without making creative efforts all fall within the scope of protection of the present disclosure.

The present disclosure provides an external meshing cylindrical gear pair with a constant meshing characteristics constructed tooth pair. The gear pair is formed by a cylindrical gear I 1 with a constructed tooth pair and a cylindrical gear II 2 with a constructed tooth pair that have the same normal tooth profile, with a constant curvature radius at a meshing point that tends to infinity, a constant sliding ratio, and a constant meshing stiffness, and technically features low manufacturing cost, high bearing capacity, high transmission efficiency, low vibration noise, and the like.

In order to make the above objective, features and advantages of the present disclosure clearer and more comprehensible, the present disclosure will be further described in detail below in combination with accompanying drawings and specific implementations.

As shown in FIGS. 1 to 7, this embodiment provides an external meshing cylindrical gear pair with a constant meshing characteristics constructed tooth pair. A normal tooth profile curve of a cylindrical gear I 1 with a constructed tooth pair and a normal tooth profile curve of a cylindrical gear II 2 with a constructed tooth pair are continuous combined curves $\Gamma_L$ with the same curve shape, and a meshing point of the cylindrical gear I 1 with a constructed tooth pair and the cylindrical gear II 2 with a constructed tooth pair is at an inflection point or a tangent point of the continuous combined curve $\Gamma_L$.

In this embodiment, basic parameters of the external meshing cylindrical gear pair with a constant meshing characteristics constructed tooth pair are as follows: Normal module $m_n$=8 mm, number of teeth of the cylindrical gear I 1 with a constructed tooth pair: $Z_1$=20, number of teeth of the cylindrical gear II 2 with a constructed tooth pair: $Z_2$=30, addendum coefficient $h_a^*$=0.5, dedendum coefficient $h_f^*$=0.5, tip clearance coefficient c*=0.2, addendum $h_a$=4 mm, dedendum $h_f$=5.6 mm, the teeth of the cylindrical gear I 1 with a constructed tooth pair being left-handed, the teeth of the cylindrical gear II 2 with a constructed tooth pair being right-handed, helix angle β=15°, and tooth width w=50 mm.

Figure 1:
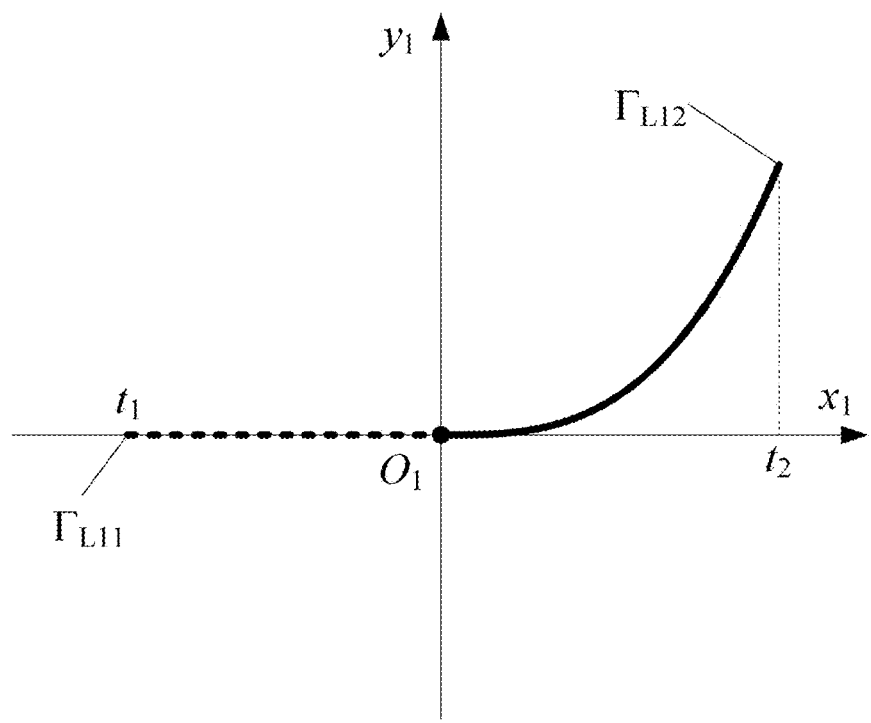
FIG. 1 is a schematic diagram of a combined curve of an odd power function curve and a tangent at an inflection point thereof according to an embodiment of the present disclosure.

With a combined curve $\Gamma_{L1}$ of an odd power function curve and a tangent at an inflection point thereof as an example, the combined curve $\Gamma_{L1}$ of the odd power function curve and the tangent at the inflection point thereof was drawn in a rectangular coordinate system $\sigma_1$ ($O_1$-$x_1$, $y_1$), as shown in FIG. 1. Taking a coefficient A=1.2 and n=2, an equation of the combined curve $\Gamma_{L1}$ (including an odd power function curve $\Gamma_{L12}$ and a tangent $\Gamma_{L11}$ at an inflection point of the odd power function curve) of an odd power function curve and a tangent at an inflection point thereof is as follows:

$$\begin{cases} \Gamma_{L11}: x_{10} = t, y_{10} = 0 & (t_1 \le t < 0) \\ \Gamma_{L21}: x_{10} = t, y_{10} = 1.2t^3 & (0 \le t \le t_2) \end{cases}$$

where $x_{10}$ and $y_{10}$ are x-axis and y-axis coordinate values of the continuous combined curve $\Gamma_L$ in the rectangular coordinate system $\sigma_1$, respectively; a parameter t is an independent variable of the equation; and $t_1$ and $t_2$ are value ranges of the continuous combined curve $\Gamma_L$.

Figure 2:
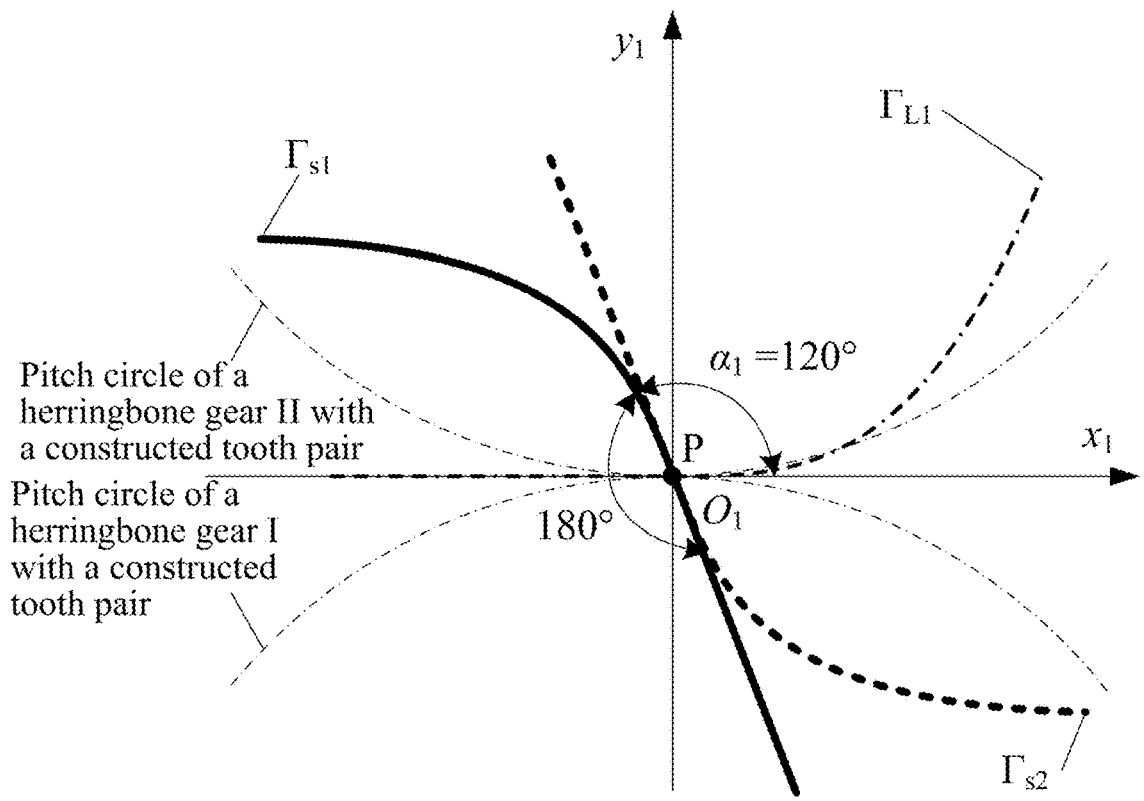
FIG. 2 is a schematic diagram illustrating formation of a normal tooth profile of an external meshing cylindrical gear pair with a constructed tooth pair having a combined curve of an odd power function curve and a tangent at an inflection point thereof as a tooth profile curve according to an embodiment of the present disclosure.

A schematic diagram illustrating formation of a normal tooth profile of an external meshing cylindrical gear pair with a constructed tooth pair having the combined curve $\Gamma_{L1}$ of an odd power function curve and a tangent at an inflection point thereof as a tooth profile curve according to this embodiment is provided, with an inflection point P being a meshing point, as shown in FIG. 2. In FIG. 2, a tooth root of the cylindrical gear I 1 with a constructed tooth pair and a tooth root of the cylindrical gear II 2 with a constructed tooth pair are tangent segments, and a tooth tip of the cylindrical gear I 1 with a constructed tooth pair and a tooth tip of the cylindrical gear II 2 with a constructed tooth pair are cubic power function curve segments. When the continuous combined curve $\Gamma_L$ rotates around an origin of the rectangular coordinate system by an angle $\alpha_1$ to obtain a normal tooth profile curve $\Gamma_{s1}$ of the cylindrical gear I 1 with a constructed tooth pair, the value of the rotation angle $\alpha_1$ needs to be determined according to specific parameters of the gear pair, with a general value range as follows: $0° < \alpha_1 < 180°$. A specific formation process and a tooth profile curve equation of the normal tooth profile of the external meshing cylindrical gear pair with a constructed tooth pair are as follows:

The combined curve $\Gamma_{L1}$ of the odd power function curve and the tangent at the inflection point thereof rotates around the rectangular coordinate system $\sigma_1$ by an angle of $\alpha_1$=120° to obtain the normal tooth profile curve $\Gamma_{s1}$ of the cylindrical gear I 1 with a constructed tooth pair, with a curve equation as follows:

$$\begin{cases} x_{01} = x_{10} \cos(120°) - y_{10}\sin(120°) \\ y_{01} = x_{10} \sin(120°) + y_{10} \cos(120°) \end{cases}$$

where $x_{01}$ and $y_{01}$ are x-axis and y-axis coordinate values of the normal tooth profile curve of the cylindrical gear I 1 with a constructed tooth pair in the rectangular coordinate system $\sigma_1$, respectively.

A normal tooth profile curve $\Gamma_{s2}$ of the cylindrical gear II 2 with a constructed tooth pair is obtained by rotating the normal tooth profile curve $\Gamma_{s1}$ of the cylindrical gear I 1 with a constructed tooth pair around the origin of the rectangular coordinate system $\sigma_1$ by an angle of 180°, with a curve equation as follows:

$$\begin{cases} x_{02} = x_{01} \cos(180°) - y_{01}\sin(180°) \\ y_{02} = x_{01} \sin(180°) + y_{01} \cos(180°) \end{cases}$$

where $x_{02}$ and $y_{02}$ are x-axis and y-axis coordinate values of the normal tooth profile curve of the cylindrical gear II 2 with a constructed tooth pair in the rectangular coordinate system $\sigma_1$, respectively.

Figure 3:
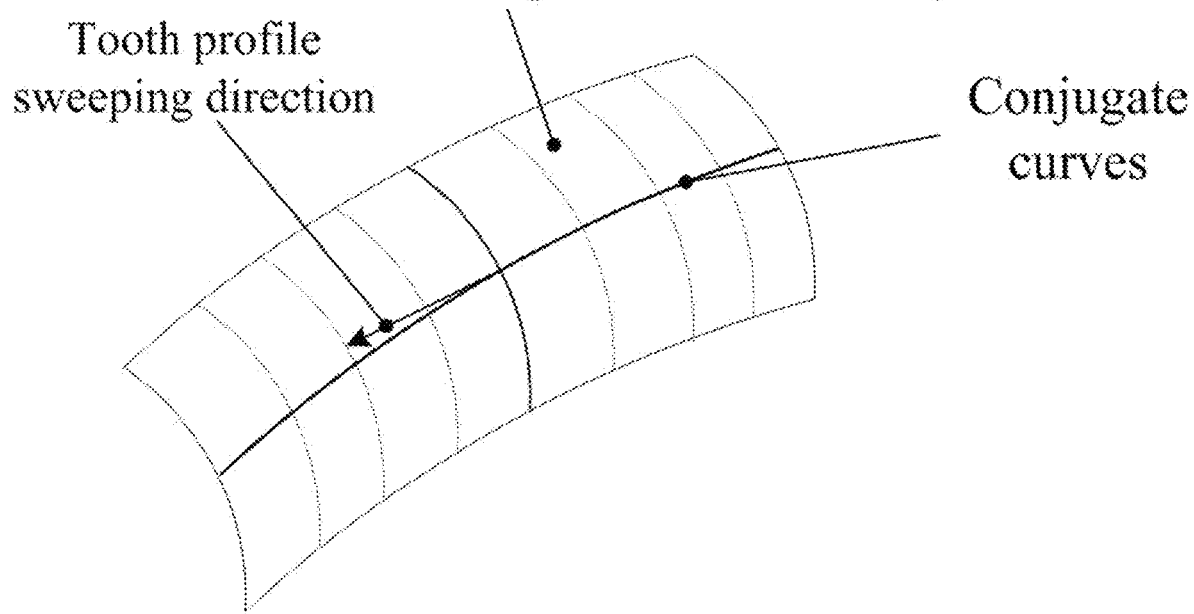
FIG. 3 is a schematic diagram illustrating construction of a tooth surface of an external meshing cylindrical gear pair with a constructed tooth pair having a combined curve of an odd power function curve and a tangent at an inflection point thereof as a tooth profile curve according to an embodiment of the present disclosure.

FIG. 3 is a schematic diagram illustrating construction of a tooth surface of an external meshing cylindrical gear pair with a constructed tooth pair having a combined curve $\Gamma_{L1}$ of an odd power function curve and a tangent at an inflection point thereof as a tooth profile curve according to this embodiment. A specific construction process and a tooth surface equation of the tooth surface of the external meshing cylindrical gear pair with a constructed tooth pair are as follows:

A tooth surface $\Sigma_1$ of the cylindrical gear I with a constructed tooth pair is obtained by sweeping the normal tooth profile curve $\Gamma_{s1}$ of the cylindrical gear I 1 with a constructed tooth pair along a given helix, with a tooth surface equation as follows:

$$\begin{cases} x_{\Sigma 1} = x_{01}\cos\theta - y_{01}\cos(15°)\sin\theta + 80\cos\theta/\cos(15°) \\ y_{\Sigma 1} = x_{01}\sin\theta + y_{01}\cos(15°)\cos\theta + 80\sin\theta/\cos(15°) \\ z_{\Sigma 1} = 80\theta\cot(15°)/\cos(15°) - y_{01}\sin(15°) \end{cases}$$

where $x_{\Sigma 1}$, $y_{\Sigma 1}$ and $z_{\Sigma 1}$ are coordinate values of the tooth surface of the cylindrical gear I 1 with a constructed tooth pair.

Similarly, a tooth surface $\Sigma_2$ of the cylindrical gear II 2 with a constructed tooth pair is obtained by sweeping the normal tooth profile curve $\Gamma_{s2}$ of the cylindrical gear II 2 with a constructed tooth pair along a given helix, with a tooth surface equation as follows:

$$\begin{cases} x_{\Sigma 2} = x_{02}\cos\theta - y_{02}\cos(15°)\sin\theta + 120\cos\theta/\cos(15°) \\ y_{\Sigma 2} = x_{02}\sin\theta + y_{02}\cos(15°)\cos\theta + 120\sin\theta/\cos(15°) \\ z_{\Sigma 2} = 120\theta\cot(15°)/\cos(15°) - y_{02}\sin(15°) \end{cases}$$

where $x_{\Sigma 2}$, $y_{\Sigma 2}$ and $z_{\Sigma 2}$ are coordinate values of the tooth surface of the cylindrical gear II 2 with a constructed tooth pair; and $\theta$ is an angle of a given contact line.

Figure 4:
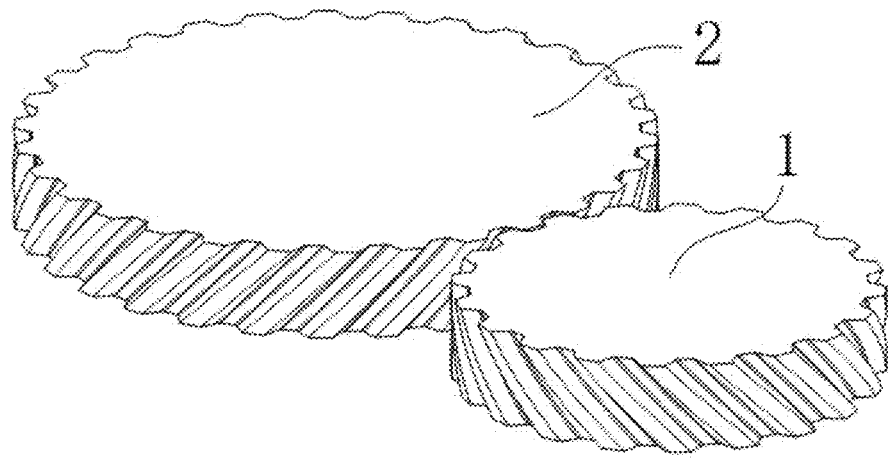
FIG. 4 is a schematic entity diagram of an external meshing cylindrical gear pair with a constructed tooth pair having a combined curve of an odd power function curve and a tangent at an inflection point thereof as a tooth profile curve according to an embodiment of the present disclosure.

FIG. 4 is a schematic entity diagram of an external meshing cylindrical gear pair with a constructed tooth pair having a combined curve $\Gamma_{L1}$ of an odd power function curve and a tangent at an inflection point thereof as a tooth profile curve according to this embodiment. An addendum circle and a dedendum circle are generated by stretching. Trimming, stitching, rounding, and other operations are performed on the tooth surfaces of the cylindrical gear I 1 with a constructed tooth pair and the cylindrical gear II 2 with a constructed tooth pair to obtain an entity model of the external meshing cylindrical gear pair with a constant meshing characteristics constructed tooth pair.

In this embodiment, the normal tooth profile curves of the cylindrical gear I 1 with a constructed tooth pair and the cylindrical gear II 2 with a constructed tooth pair each may alternatively be a combined curve $\Gamma_{L2}$ of a sine function curve and a tangent at an inflection point thereof, a combined curve $\Gamma_{L3}$ of an epicycloid function curve and a tangent at an inflection point thereof, a combined curve $\Gamma_{L4}$ of an odd power function, a combined curve $\Gamma_{L5}$ of a sine function, or a combined curve $\Gamma_{L6}$ of an epicycloid function, with a curve equation as follows:

When the continuous combined curve $\Gamma_L$ is the combined curve $\Gamma_{L2}$ of the sine function curve and the tangent at the inflection point thereof, the continuous combined curve $\Gamma_L$ includes a sine function curve $\Gamma_{L22}$ and a tangent $\Gamma_{L21}$ at an inflection point of the sine function curve; a rectangular coordinate system is established at the tangent point of the continuous combined curve $\Gamma_L$, and an equation of the combined curve $\Gamma_{L2}$ of the sine function curve and the tangent at the inflection point thereof is as follows:

$$\begin{cases} \Gamma_{L21}: x_{20} = t, y_{20} = kt & (t_1 \le t < 0) \\ \Gamma_{L22}: x_{20} = t, y_{20} = A\sin(Bt) & (0 \le t \le t_2) \end{cases}$$

where $x_{20}$ and $y_{20}$ are x-axis and y-axis coordinate values of the continuous combined curve $\Gamma_L$ in the rectangular coordinate system, respectively; a parameter t is an independent variable of the equation; $t_1$ and $t_2$ are value ranges of the continuous combined curve $\Gamma_L$; k is a slope of the tangent $\Gamma_{L21}$ at the inflection point of the sine function curve; and A and B are coefficients of the equation.

When the continuous combined curve $\Gamma_L$ is the combined curve $\Gamma_{L3}$ of the epicycloid function curve and the tangent at the inflection point thereof, the continuous combined curve $\Gamma_L$ includes an epicycloid function curve $\Gamma_{L32}$ and a tangent $\Gamma_{31}$ at an inflection point of the epicycloid function curve; a rectangular coordinate system is established at the tangent point of the continuous combined curve $\Gamma_L$, and an equation of the combined curve $\Gamma_{L3}$ of the epicycloid function curve and the tangent at the inflection point thereof is as follows:

$$\begin{cases} \Gamma_{L31}: x_{30} = t, y_{30} = kt & (t_1 \le t < 0) \\ \Gamma_{L32}: \\ x_{30} = (R+r)\sin t - e\sin((R+r)t/r) & (0 \le t < t_2) \\ y_{30} = (R+r)\cos t - e\cos((R+r)t/r) - (R+r-e) \end{cases}$$

where $x_{30}$ and $y_{30}$ are x-axis and y-axis coordinate values of the continuous combined curve $\Gamma_L$ in the rectangular coordinate system, respectively; a parameter t is an independent variable of the equation; $t_1$ and $t_2$ are value ranges of the continuous combined curve $\Gamma_L$; k is a slope of the tangent $\Gamma_{L31}$ at the inflection point of the epicycloid function curve; R is a radius of a cycloidal fixed circle; r is a radius of a moving circle; and e is an eccentric distance.

When the continuous combined curve $\Gamma_L$ is the combined curve $\Gamma_{L4}$ of the odd power function, the continuous combined curve $\Gamma_L$ includes a first odd power function curve $\Gamma_{L41}$ and a second odd power function curve $\Gamma_{L42}$; a rectangular coordinate system is established at the inflection point of the continuous combined curve $\Gamma_L$, and an equation of the combined curve $\Gamma_{L4}$ of the odd power function is as follows:

$$\begin{cases} \Gamma_{L41}: x_{40} = t, y_{40} = At^{2n1-1} & (t_1 \le t < 0) \\ \Gamma_{L42}: x_{40} = t, y_{40} = Bt^{2n2-1} & (0 \le t \le t_2) \end{cases}$$

where $x_{40}$ and $y_{40}$ are x-axis and y-axis coordinate values of the continuous combined curve $\Gamma_L$ in the rectangular coordinate system, respectively; a parameter t is an independent variable of the equation; $t_1$ and $t_2$ are value ranges of the continuous combined curve $\Gamma_L$; A and B are coefficients of the equation; and n1 and n2 are degrees of the independent variable and are positive integers.

When the continuous combined curve $\Gamma_L$ is the combined curve $\Gamma_{L5}$ of the sine function, the continuous combined curve $\Gamma_L$ includes a first sine function curve $\Gamma_{L51}$ and a second sine function curve $\Gamma_{L52}$; a rectangular coordinate system is established at the inflection point of the continuous combined curve $\Gamma_L$, and an equation of the combined curve $\Gamma_{L5}$ of the sine function is as follows:

$$\begin{cases} \Gamma_{L51}: x_{50} = t, y_{50} = A_1\sin(B_1 t) & (t_1 \le t < 0) \\ \Gamma_{L52}: x_{50} = t, y_{50} = A_2\sin(B_2 t) & (0 \le t \le t_2) \end{cases}$$

where $x_{50}$ and $y_{50}$ are x-axis and y-axis coordinate values of the continuous combined curve $\Gamma_L$ in the rectangular coordinate system, respectively; a parameter t is an independent variable of the equation; $t_1$ and $t_2$ are value ranges of the continuous combined curve $\Gamma_L$; and $A_1$, $B_1$, $A_2$ and $B_2$ are coefficients of the equation.

When the continuous combined curve $\Gamma_L$ is the combined curve $\Gamma_{L6}$ of the epicycloid function, the continuous combined curve $\Gamma_L$ includes a first epicycloid function curve $\Gamma_{L61}$ and a second epicycloid function curve $\Gamma_{L62}$; a rectangular coordinate system is established at the inflection point of the continuous combined curve $\Gamma_L$, and an equation of the combined curve $\Gamma_{L6}$ of the epicycloid function is as follows:

$$\begin{cases} \Gamma_{L61}: \\ x_{60} = (R_1 + r_1)\sin t + e\sin((R_1 + r_1)t/r_1) & (t_1 \le t < 0) \\ y_{60} = (R_1 + r_1)\cos t + e\cos((R_1 + r_1)t/r_1) + (R_1 + r_1 - e) \\ \Gamma_{L62}: \\ x_{60} = (R_2 + r_2)\sin t - e\sin((R_2 + r_2)t/r_2) & (0 \le t < t_2) \\ y_{60} = (R_2 + r_2)\cos t - e\cos((R_2 + r_2)t/r_2) - (R_2 + r_2 - e) \end{cases}$$

where a parameter t is an independent variable of the equation; $t_1$ and $t_2$ are value ranges of the continuous combined curve $\Gamma_L$; $R_1$ and $r_1$ are radii of a first epicycloid moving circle and fixed circle, respectively, and $R_2$ and $r_2$ are radii of a second epicycloid moving circle and fixed circle, respectively; e is an eccentric distance; and $x_{60}$ and $y_{60}$ are x-axis and y-axis coordinate values of the continuous combined curve $\Gamma_L$ in the rectangular coordinate system, respectively.

In this embodiment, the inflection point or the tangent point of the continuous combined curve $\Gamma_L$ is as follows:
1. When the continuous combined curve $\Gamma_L$ is a combined curve $\Gamma_{L4}$ of an odd power function, a combined curve $\Gamma_{L5}$ of a sine function or a combined curve $\Gamma_{L6}$ of an epicycloid function, a connection point of the continuous combined curve $\Gamma_L$ is an inflection point, that is, a concave-convex boundary point of the curve, a second derivative of the curve is zero at this point, and second order derivative signs near two sides of this point are opposite;
2. when the continuous combined curve $\Gamma_L$ is a combined curve $\Gamma_{L1}$ of an odd power function curve and a tangent at an inflection point thereof, a combined curve $\Gamma_{L2}$ of a sine function curve and a tangent at an inflection point thereof, or a combined curve $\Gamma_{L3}$ of an epicycloid function curve and a tangent at an inflection point thereof, a connection point of the continuous combined curve $\Gamma_L$ is an inflection point of the odd power function curve $\Gamma_{L12}$, the sine function curve $\Gamma_{L22}$ or the epicycloid function curve $\Gamma_{L32}$ (meaning the same as 1), which is also a tangent point of the odd power function curve $\Gamma_{L12}$, the sine function curve $\Gamma_{L22}$ or the epicycloid function curve $\Gamma_{L32}$ at the tangent.

Figure 5:
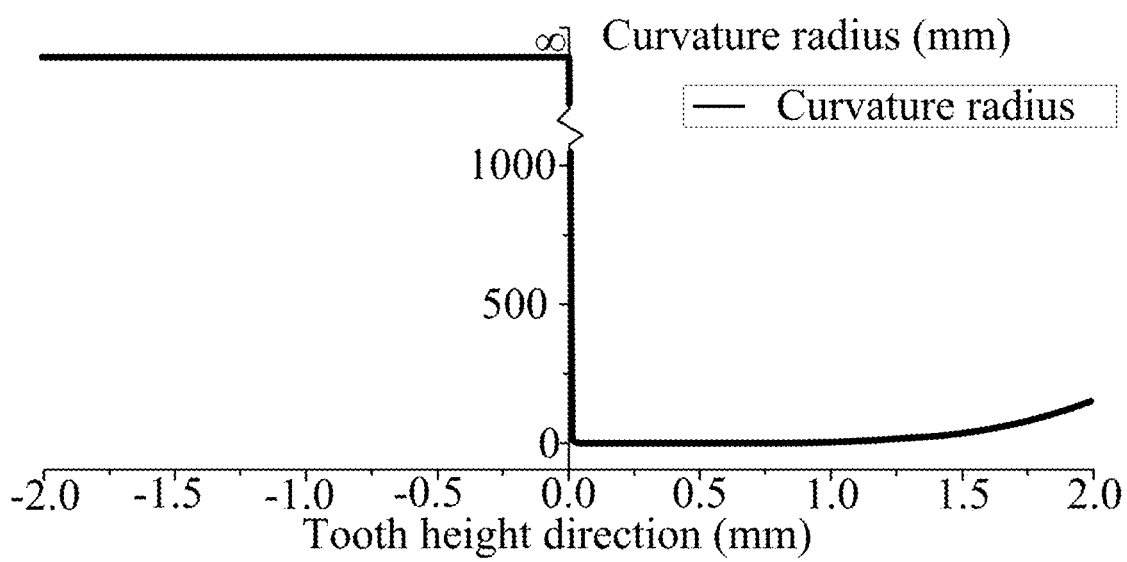
FIG. 5 is a schematic diagram illustrating a curvature radius at a meshing point of an external meshing cylindrical gear pair with a constructed tooth pair having a combined curve of an odd power function curve and a tangent at an inflection point thereof as a tooth profile curve according to an embodiment of the present disclosure.

At the inflection point or the tangent point of the continuous combined curve $\Gamma_L$, the curvature of the continuous combined curve $\Gamma_L$ is zero, that is, the curvature radius tends to infinity. When the continuous combined curve $\Gamma_L$ is the combined curve $\Gamma_{L4}$ of the odd power function, the combined curve $\Gamma_{L5}$ of the sine function, or the combined curve $\Gamma_{L6}$ of the epicycloid function, the curvature radii on two sides of the inflection point tend to infinity; or when the continuous combined curve $\Gamma_L$ is the combined curve $\Gamma_{L1}$ of the odd power function curve and the tangent at the inflection point thereof, the combined curve $\Gamma_{L2}$ of the sine function curve and the tangent at the inflection point thereof, or the combined curve $\Gamma_{L3}$ of the epicycloid function curve and the tangent at the inflection point thereof, the curvature radius at the inflection point on the side of the odd power function curve $\Gamma_{L12}$, the sine function curve $\Gamma_{L22}$ or the epicycloid function curve $\Gamma_{L32}$ tends to infinity, and the curvature radius on the side of the tangent is infinite. The curvature radius of the continuous combined curve $\Gamma_L$ is calculated based on given parameters in the embodiment, as shown in FIG. 5. The curvature radius of a straight line segment in the continuous combined curve $\Gamma_L$ in FIG. 5 is infinite, the curvature radius at the inflection point tends to infinity, and the curvature radius of the cubic power function curve segment gradually decreases and then increases, but is still far less than the curvature radius at the inflection point. This means that the curvature radius at a contact point of the gear pair with a constructed tooth pair tends to infinity, which improves the bearing capacity of the gear pair with a constructed tooth pair.

Figure 6:
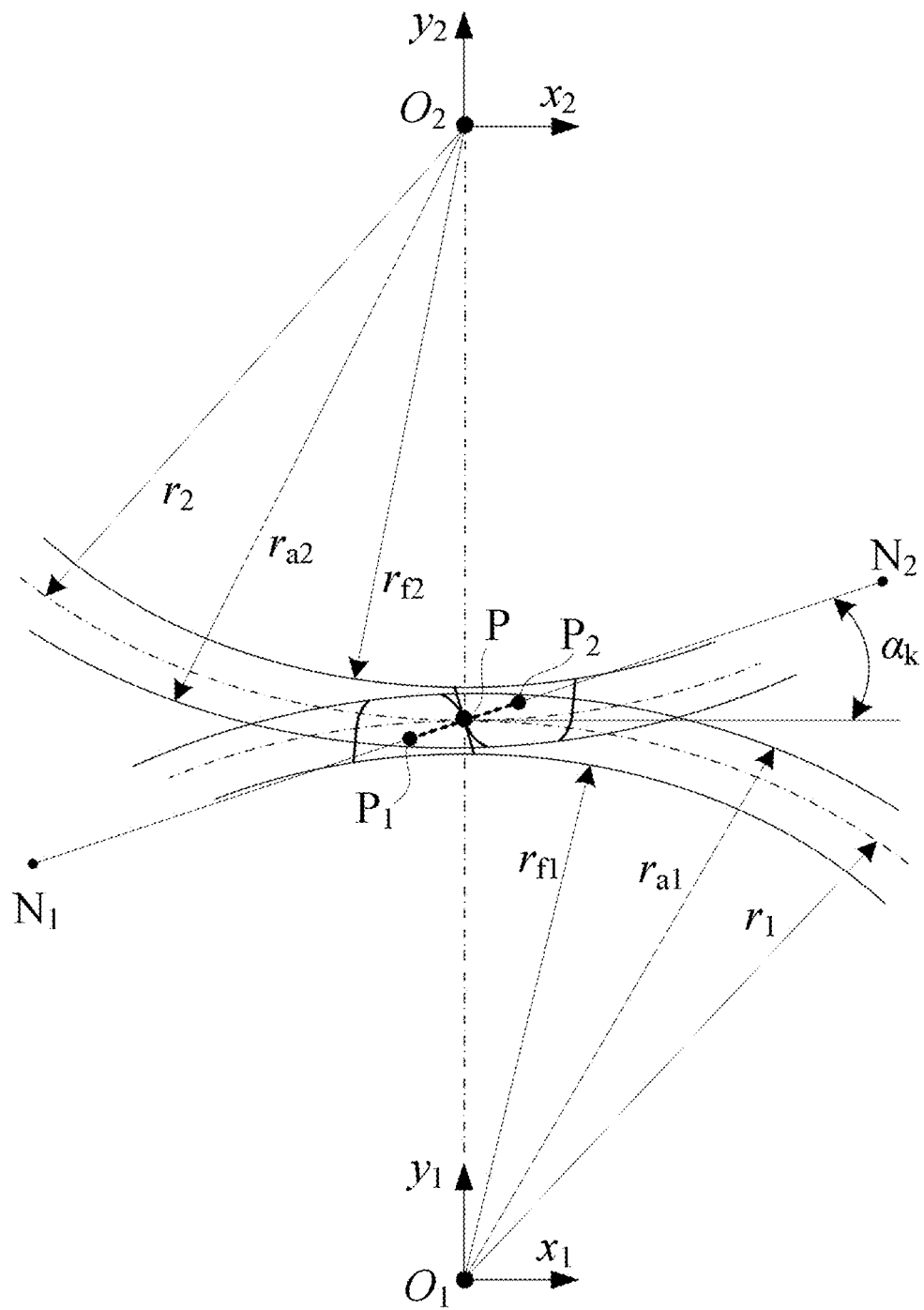
FIG. 6 is a schematic diagram of a designated point on a meshing force action line of an external meshing cylindrical gear pair with a constructed tooth pair according to an embodiment of the present disclosure.

In this embodiment, the inflection point or the tangent point of the continuous combined curve $\Gamma_L$ is a designated point located on a meshing force action line of the gear pair. The designated point is specifically defined as a given point at a pitch point or near the pitch point on the meshing force action line of the external meshing cylindrical gear pair with a constructed tooth pair that is a straight line which forms a certain angle (pressure angle) with a horizontal axis by means of the pitch point. FIG. 6 is a schematic diagram of a designated point on a meshing force action line of a gear pair. In the figure, P is the designated point on the meshing force action line of the gear pair; $P_1$ and $P_2$ are limit points of the position range of the designated point; a straight line $N_1N_2$ is the meshing force action line of the gear pair; $\alpha_k$ is a pressure angle; $O_1$-$x_1y_1$ is a local rectangular coordinate system of the cylindrical gear I 1 with a constructed tooth pair, and $O_2$-$x_2y_2$ is a local rectangular coordinate system of the cylindrical gear II 2 with a constructed tooth pair, respectively; $r_1$ is a pitch radius of the cylindrical gear I 1 with a constructed tooth pair, $r_2$ is a pitch radius of the cylindrical gear II 2 with a constructed tooth pair, $r_{a1}$ is an addendum circle radius of the cylindrical gear I 1 with a constructed tooth pair, $r_{a2}$ is an addendum circle radius of the cylindrical gear II 2 with a constructed tooth pair, $r_{f1}$ is a dedendum circle radius of the cylindrical gear I 1 with a constructed tooth pair, and $r_{f2}$ is a dedendum circle radius of the cylindrical gear II 2 with a constructed tooth pair. The designated point P is a given point usually located at the pitch point or near either of two sides of the pitch point, and a variation area of the designated point does not exceed a half of a tooth height.

Figure 7:
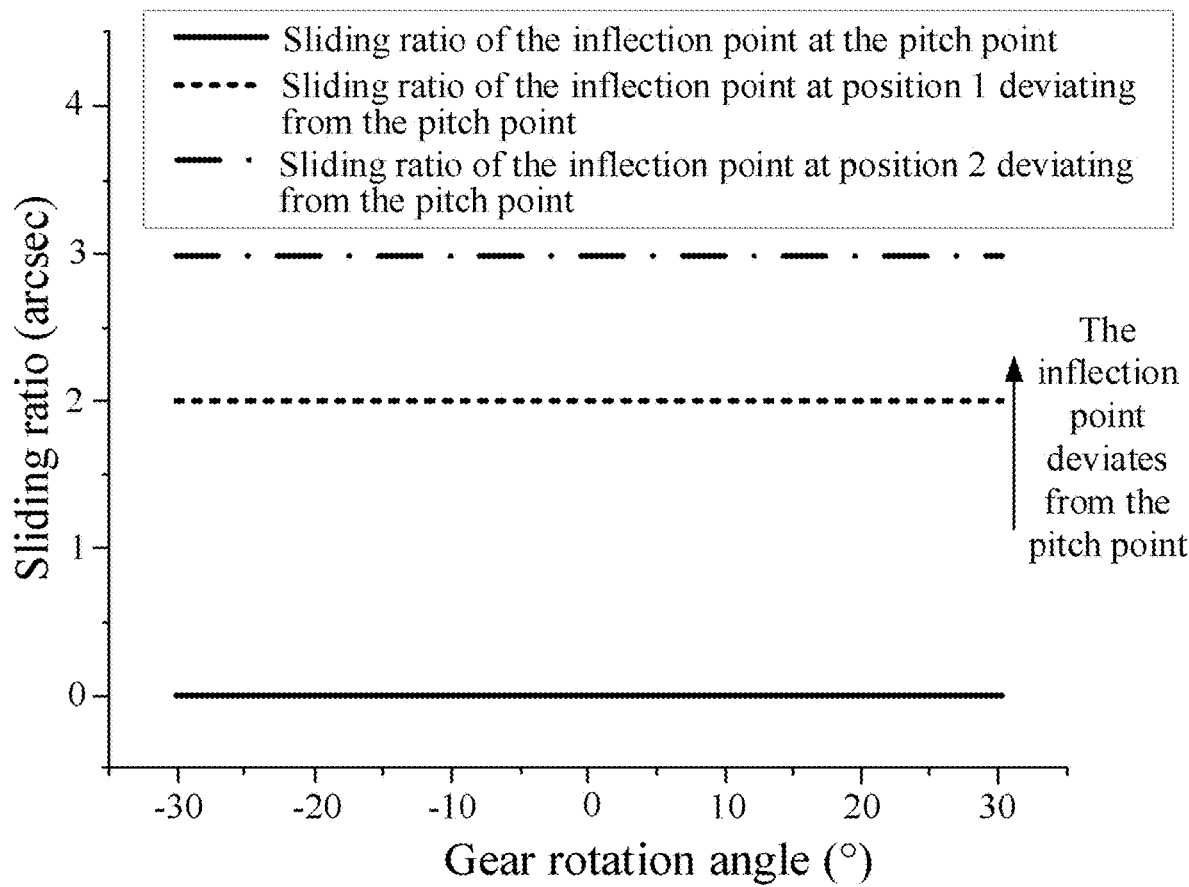
FIG. 7 is a schematic diagram illustrating a sliding ratio at a meshing point of an external meshing cylindrical gear pair with a constructed tooth pair having a combined curve of an odd power function curve and a tangent at an inflection point thereof as a tooth profile curve according to an embodiment of the present disclosure.

According to the principle of gear meshing, it can be known that there is no relative sliding between tooth surfaces when the external meshing cylindrical gear pair with a constructed tooth pair meshes at the pitch point. FIG. 7 is a schematic diagram illustrating a sliding ratio at a meshing point of an external meshing cylindrical gear pair with a constructed tooth pair having a combined curve $\Gamma_{L1}$ of an odd power function curve and a tangent at an inflection point thereof as a tooth profile curve according to this embodiment. Since the external meshing cylindrical gear pair with a constant meshing characteristics constructed tooth pair meshes at the pitch point at any time in the embodiment, the external meshing cylindrical gear pair with a constructed tooth pair can achieve zero-sliding meshing. When the inflection point or the tangent point of the continuous combined curve $\Gamma_L$ does not coincide with the pitch point, the sliding ratio of the external meshing cylindrical gear pair with a constructed tooth pair is also constant but is not zero. A closer inflection point or tangent point of the continuous combined curve $\Gamma_L$ to the pitch point indicates a smaller sliding ratio of the external meshing cylindrical gear pair with a constructed tooth pair, vice versa. When the inflection point or the tangent point coincides with the pitch point, the external meshing cylindrical gear pair with a constructed tooth pair can achieve zero-sliding meshing transmission, which reduces the wear between tooth surfaces and improves the transmission efficiency of the gear pair.

Further, when a contact ratio of the external meshing cylindrical gear pair with a constant meshing characteristics constructed tooth pair is designed as an integer, the meshing stiffness of the external meshing cylindrical gear pair with a constructed tooth pair is a constant, and at this time, a meshing force of the external meshing cylindrical gear pair with a constructed tooth pair at any meshing position is determined. Therefore, when the contact ratio is designed as an integer, the external meshing cylindrical gear pair with a constant meshing characteristics constructed tooth pair has a constant meshing state at any time, which effectively ensures stability of dynamic meshing performance of the external meshing cylindrical gear pair with a constructed tooth pair and can effectively reduce vibration noise of the external meshing cylindrical gear pair with a constructed tooth pair.

Specific examples are used in this description to illustrate the principles and implementations of the present disclosure. The description of the above embodiments is merely used to help understand the method and its core ideas of the present disclosure. In addition, those of ordinary skill in the art can make changes in terms of specific implementations and the application scope according to the ideas of the present disclosure. In conclusion, the content of this description shall not be construed as limitations to the present disclosure.

What is claimed is:

1. An external meshing cylindrical gear pair with a constant meshing characteristics constructed tooth pair, comprising a cylindrical gear I with a constructed tooth pair and a cylindrical gear II with a constructed tooth pair as a pair based on conjugate curves, wherein a normal tooth profile curve $\Gamma_{s1}$ of the cylindrical gear I with a constructed tooth pair and a normal tooth profile curve $\Gamma_{s2}$ of the cylindrical gear II with a constructed tooth pair are continuous combined curves $\Gamma_L$ with the same curve shape, and the continuous combined curve $\Gamma_L$ is a combined curve $\Gamma_{L1}$ of an odd power function curve and a tangent at an inflection point thereof, a combined curve $\Gamma_{L2}$ of a sine function curve and a tangent at an inflection point thereof, a combined curve $\Gamma_{L3}$ of an epicycloid function curve and a tangent at an inflection point thereof, a combined curve $\Gamma_{L4}$ of an odd power function, a combined curve $\Gamma_{L5}$ of a sine function, or a combined curve $\Gamma_{L6}$ of an epicycloid function; the continuous combined curve $\Gamma_L$ is formed by two continuous curves, a connection point of the two continuous curves is an inflection point or a tangent point of the continuous combined curve $\Gamma_L$, and the inflection point or the tangent point of the continuous combined curve $\Gamma_L$ is a designated point located on a meshing force action line of the external meshing cylindrical gear pair with a constant meshing characteristics constructed tooth pair; the normal tooth profile curve $\Gamma_{s1}$ of the cylindrical gear I with a constructed tooth pair is swept along given conjugate curves to obtain a tooth surface of the cylindrical gear I with a constructed tooth pair, and the normal tooth profile curve $\Gamma_{s2}$ of the cylindrical gear II with a constructed tooth pair is swept along the given conjugate curves to obtain a tooth surface of the cylindrical gear II with a constructed tooth pair.

2. The external meshing cylindrical gear pair with a constant meshing characteristics constructed tooth pair according to claim 1, wherein when the continuous combined curve $\Gamma_L$ is the combined curve $\Gamma_{L1}$ of the odd power function curve and the tangent at the inflection point thereof, the continuous combined curve $\Gamma_L$ comprises an odd power function curve $\Gamma_{L12}$ and a tangent $\Gamma_{L11}$ at an inflection point of the odd power function curve; a rectangular coordinate system is established at the tangent point of the continuous combined curve $\Gamma_L$, and an equation of the combined curve $\Gamma_{L1}$ of the odd power function curve and the tangent at the inflection point thereof is as follows:

$$\begin{cases} \Gamma_{L11}:x_{10}=t,\ y_{10}=0 & (t_1 \leq t < 0) \\ \Gamma_{L12}:x_{10}=t,\ y_{10}=At^{2n-1} & (0 \leq t \leq t_2) \end{cases}$$

wherein $x_{10}$ and $y_{10}$ are x-axis and y-axis coordinate values of the continuous combined curve $\Gamma_L$ in the rectangular coordinate system, respectively; a parameter t is an independent variable of the equation; $t_1$ and $t_2$ are value ranges of the continuous combined curve $\Gamma_L$; A is a coefficient of the equation; and n is a degree of the independent variable and is a positive integer.

3. The external meshing cylindrical gear pair with a constant meshing characteristics constructed tooth pair according to claim 1, wherein when the continuous combined curve $\Gamma_L$ is the combined curve $\Gamma_{L2}$ of the sine function curve and the tangent at the inflection point thereof, the continuous combined curve $\Gamma_L$ comprises a sine function curve $\Gamma_{L22}$ and a tangent $\Gamma_{L21}$ at an inflection point of the sine function curve; a rectangular coordinate system is established at the tangent point of the continuous combined curve $\Gamma_L$, and an equation of the combined curve $\Gamma_{L2}$ of the sine function curve and the tangent at the inflection point thereof is as follows:

$$\begin{cases} \Gamma_{L21}:x_{20}=t,\ y_{20}=kt & (t_1 \leq t < 0) \\ \Gamma_{L22}:x_{20}=t,\ y_{20}=A\sin(Bt) & (0 \leq t \leq t_2) \end{cases}$$

wherein $x_{20}$ and $y_{20}$ are x-axis and y-axis coordinate values of the continuous combined curve $\Gamma_L$ in the rectangular coordinate system, respectively; a parameter t is an independent variable of the equation; $t_1$ and $t_2$ are value ranges of the continuous combined curve $\Gamma_L$; k is a slope of the tangent $\Gamma_{L21}$ at the inflection point of the sine function curve; and A and B are coefficients of the equation.

4. The external meshing cylindrical gear pair with a constant meshing characteristics constructed tooth pair according to claim 1, wherein when the continuous combined curve $\Gamma_L$ is the combined curve $\Gamma_{L3}$ of the epicycloid function curve and the tangent at the inflection point thereof, the continuous combined curve $\Gamma_L$ comprises an epicycloid function curve $\Gamma_{L32}$ and a tangent $\Gamma_{L31}$ at an inflection point of the epicycloid function curve; a rectangular coordinate system is established at the tangent point of the continuous combined curve $\Gamma_L$, and an equation of the combined curve $\Gamma_{L3}$ of the epicycloid function curve and the tangent at the inflection point thereof is as follows:

$$\begin{cases} \Gamma_{L31}:x_{30}=t,\ y_{30}=kt & (t_1 \leq t < 0) \\ \Gamma_{L32}: \\ \quad x_{30}=(R+r)\sin t - e\sin((R+r)t/r) \\ \quad y_{30}=(R+r)\cos t - e\cos((R+r)t/r)-(R+r-e) \end{cases} \quad (0 \leq t < t_2)$$

wherein $x_{30}$ and $y_{30}$ are x-axis and y-axis coordinate values of the continuous combined curve $\Gamma_L$ in the rectangular coordinate system, respectively; a parameter t is an independent variable of the equation; $t_1$ and $t_2$ are value ranges of the continuous combined curve $\Gamma_L$; k is a slope of the tangent $\Gamma_{L31}$ at the inflection point of the epicycloid function curve; R is a radius of a cycloidal fixed circle; r is a radius of a moving circle; and e is an eccentric distance.

5. The external meshing cylindrical gear pair with a constant meshing characteristics constructed tooth pair according to claim 1, wherein when the continuous combined curve $\Gamma_L$ is the combined curve $\Gamma_{L4}$ of the odd power function, the continuous combined curve $\Gamma_L$ comprises a first odd power function curve $\Gamma_{L41}$ and a second odd power function curve $\Gamma_{L42}$; a rectangular coordinate system is established at the inflection point of the continuous combined curve $\Gamma_L$, and an equation of the combined curve $\Gamma_{L4}$ of the odd power function is as follows:

$$\begin{cases} \Gamma_{L41}: x_{40}=t,\; y_{40}=At^{2n1-1}\;(t_1\le t<0) \\ \Gamma_{L42}: x_{40}=t,\; y_{40}=Bt^{2n2-1}\;(0\le t\le t_2) \end{cases}$$

wherein $x_{40}$ and $y_{40}$ are x-axis and y-axis coordinate values of the continuous combined curve $\Gamma_L$ in the rectangular coordinate system, respectively; a parameter t is an independent variable of the equation; $t_1$ and $t_2$ are value ranges of the continuous combined curve $\Gamma_L$; A and B are coefficients of the equation; and n1 and n2 are degrees of the independent variable and are positive integers.

6. The external meshing cylindrical gear pair with a constant meshing characteristics constructed tooth pair according to claim 1, wherein when the continuous combined curve $\Gamma_L$ is the combined curve $\Gamma_{L5}$ of the sine function, the continuous combined curve $\Gamma_L$ comprises a first sine function curve $\Gamma_{L51}$ and a second sine function curve $\Gamma_{L52}$; a rectangular coordinate system is established at the inflection point of the continuous combined curve $\Gamma_L$, and an equation of the combined curve $\Gamma_{L5}$ of the sine function is as follows:

$$\begin{cases} \Gamma_{L51}: x_{50}=t,\; y_{50}=A_1\sin(B_1 t)\;(t_1\le t<0) \\ \Gamma_{L52}: x_{50}=t,\; y_{50}=A_2\sin(B_2 t)\;(0\le t\le t_2) \end{cases}$$

wherein $x_{50}$ and $y_{50}$ are x-axis and y-axis coordinate values of the continuous combined curve $\Gamma_L$ in the rectangular coordinate system, respectively; a parameter t is an independent variable of the equation; $t_1$ and $t_2$ are value ranges of the continuous combined curve $\Gamma_L$; and $A_1$, $B_1$, $A_2$ and $B_2$ are coefficients of the equation.

7. The external meshing cylindrical gear pair with a constant meshing characteristics constructed tooth pair according to claim 1, wherein when the continuous combined curve $\Gamma_L$ is the combined curve $\Gamma_{L6}$ of the epicycloid function, the continuous combined curve $\Gamma_L$ comprises a first epicycloid function curve $\Gamma_{L61}$ and a second epicycloid function curve $\Gamma_{L62}$; a rectangular coordinate system is established at the inflection point of the continuous combined curve $\Gamma_L$, and an equation of the combined curve $\Gamma_{L6}$ of the epicycloid function is as follows:

$$\begin{cases} \Gamma_{L61}: \\ \quad x_{60}=-(R_1+r_1)\sin t + e\sin((R_1+r_1)t/r_1) \quad (t_1\le t<0) \\ \quad y_{60}=-(R_1+r_1)\cos t + e\cos((R_1+r_1)t/r_1) + (R_1+r_1-e) \\ \Gamma_{L62}: \\ \quad x_{60}=(R_2+r_2)\sin t - e\sin((R_2+r_2)t/r_2) \quad (0\le t<t_2) \\ \quad y_{60}=(R_2+r_2)\cos t - e\cos((R_2+r_2)t/r_2) - (R_2+r_2-e) \end{cases}$$

wherein $x_{60}$ and $y_{60}$ are x-axis and y-axis coordinate values of the continuous combined curve $\Gamma_L$ in the rectangular coordinate system, respectively; a parameter t is an independent variable of the equation; $t_1$ and $t_2$ are value ranges of the continuous combined curve $\Gamma_L$; $R_1$, $r_1$, $R_2$ and $r_2$ are radii of a cycloidal moving circle and fixed circle, respectively; and e is an eccentric distance.

8. The external meshing cylindrical gear pair with a constant meshing characteristics constructed tooth pair according to claim 2, wherein a curve equation of the normal tooth profile curve $\Gamma_{s1}$ of the cylindrical gear I with a constructed tooth pair obtained by rotating the continuous combined curve $\Gamma_L$ around an origin of the rectangular coordinate system by an angle $\alpha_1$ is as follows:

$$\begin{cases} x_{01}=x_{n0}\cos\alpha_1 - y_{n0}\sin\alpha_1 \\ y_{01}=x_{n0}\sin\alpha_1 + y_{n0}\cos\alpha_1 \end{cases}(n=1,2,3,4,5,6)$$

wherein $x_{01}$ and $y_{01}$ are x-axis and y-axis coordinate values of the normal tooth profile curve of the cylindrical gear I with a constructed tooth pair in the rectangular coordinate system, respectively.

9. The external meshing cylindrical gear pair with a constant meshing characteristics constructed tooth pair according to claim 8, wherein a curve equation of the normal tooth profile curve $\Gamma_{s2}$ of the cylindrical gear II with a constructed tooth pair obtained by rotating the normal tooth profile curve $\Gamma_{s1}$ of the cylindrical gear I with a constructed tooth pair around the origin of the rectangular coordinate system by an angle of 180° is as follows:

$$\begin{cases} x_{02}=x_{01}\cos(180°)-y_{01}\sin(180°) \\ y_{02}=x_{01}\sin(180°)+y_{01}\cos(180°) \end{cases}$$

wherein $x_{02}$ and $y_{02}$ are x-axis and y-axis coordinate values of the normal tooth profile curve of the cylindrical gear II with a constructed tooth pair in the rectangular coordinate system, respectively.

10. The external meshing cylindrical gear pair with a constant meshing characteristics constructed tooth pair according to claim 8, wherein a tooth surface $\Sigma 1$ of the cylindrical gear I with a constructed tooth pair is obtained by sweeping the normal tooth profile curve $\Gamma_{s1}$ of the cylindrical gear I with a constructed tooth pair along a given helix, with a tooth surface equation as follows:

$$\begin{cases} x_{\Sigma 1}=x_{01}\cos\theta - y_{01}\cos\beta\sin\theta + r\cos\theta \\ y_{\Sigma 1}=x_{01}\sin\theta + y_{01}\cos\beta\cos\theta + r\sin\theta \\ z_{\Sigma 1}=r\theta\cot\beta - y_{01}\sin\beta \end{cases}$$

wherein $x_{\Sigma 1}$, $y_{\Sigma 1}$ and $z_{\Sigma 1}$ are coordinate values of the tooth surface of the cylindrical gear I with a constructed tooth pair, respectively; β is a helix angle of the gear pair, θ is an angle of a given contact line, and r is a pitch radius of the cylindrical gear I with a constructed tooth pair.

11. The external meshing cylindrical gear pair with a constant meshing characteristics constructed tooth pair according to claim 9, wherein a tooth surface Σ2 of the cylindrical gear II with a constructed tooth pair is obtained by sweeping the normal tooth profile curve $\Gamma_{s2}$ of the cylindrical gear II with a constructed tooth pair along a given helix, with a tooth surface equation as follows:

$$\begin{cases} x_{\Sigma 2} = x_{02}\cos\theta - y_{02}\cos\beta\sin\theta + (a-r)\cos\theta \\ y_{\Sigma 2} = x_{02}\sin\theta + y_{02}\cos\beta\cos\theta + (a-r)\sin\theta \\ z_{\Sigma 2} = (a-r)\theta\cot\beta - y_{02}\sin\beta \end{cases}$$

wherein $x_{\Sigma 2}$, $y_{\Sigma 2}$ and $z_{\Sigma 2}$ are coordinate values of the tooth surface of the cylindrical gear II with a constructed tooth pair, respectively; and a is a center distance of the external meshing cylindrical gear pair with a constructed tooth pair.

12. The external meshing cylindrical gear pair with a constant meshing characteristics constructed tooth pair according to claim 1, wherein a contact ratio of the external meshing cylindrical gear pair with a constant meshing characteristics constructed tooth pair is designed as an integer.

13. The external meshing cylindrical gear pair with a constant meshing characteristics constructed tooth pair according to claim 3, wherein a curve equation of the normal tooth profile curve $\Gamma_{s1}$ of the cylindrical gear I with a constructed tooth pair obtained by rotating the continuous combined curve $\Gamma_L$ around an origin of the rectangular coordinate system by an angle $\alpha_1$ is as follows:

$$\begin{cases} x_{01} = x_{n0}\cos\alpha_1 - y_{n0}\sin\alpha_1 \\ y_{01} = x_{n0}\sin\alpha_1 + y_{n0}\cos\alpha_1 \end{cases} (n=1,2,3,4,5,6)$$

wherein $x_{01}$ and $y_{01}$ are x-axis and y-axis coordinate values of the normal tooth profile curve of the cylindrical gear I with a constructed tooth pair in the rectangular coordinate system, respectively.

14. The external meshing cylindrical gear pair with a constant meshing characteristics constructed tooth pair according to claim 4, wherein a curve equation of the normal tooth profile curve $\Gamma_{s1}$ of the cylindrical gear I with a constructed tooth pair obtained by rotating the continuous combined curve $\Gamma_L$ around an origin of the rectangular coordinate system by an angle $\alpha_1$ is as follows:

$$\begin{cases} x_{01} = x_{n0}\cos\alpha_1 - y_{n0}\sin\alpha_1 \\ y_{01} = x_{n0}\sin\alpha_1 + y_{n0}\cos\alpha_1 \end{cases} (n=1,2,3,4,5,6)$$

wherein $x_{01}$ and $y_{01}$ are x-axis and y-axis coordinate values of the normal tooth profile curve of the cylindrical gear I with a constructed tooth pair in the rectangular coordinate system, respectively.

15. The external meshing cylindrical gear pair with a constant meshing characteristics constructed tooth pair according to claim 5, wherein a curve equation of the normal tooth profile curve $\Gamma_{s1}$ of the cylindrical gear I with a constructed tooth pair obtained by rotating the continuous combined curve $\Gamma_L$ around an origin of the rectangular coordinate system by an angle $\alpha_1$ is as follows:

$$\begin{cases} x_{01} = x_{n0}\cos\alpha_1 - y_{n0}\sin\alpha_1 \\ y_{01} = x_{n0}\sin\alpha_1 + y_{n0}\cos\alpha_1 \end{cases} (n=1,2,3,4,5,6)$$

wherein $x_{01}$ and $y_{01}$ are x-axis and y-axis coordinate values of the normal tooth profile curve of the cylindrical gear I with a constructed tooth pair in the rectangular coordinate system, respectively.

16. The external meshing cylindrical gear pair with a constant meshing characteristics constructed tooth pair according to claim 6, wherein a curve equation of the normal tooth profile curve $\Gamma_{s1}$ of the cylindrical gear I with a constructed tooth pair obtained by rotating the continuous combined curve $\Gamma_L$ around an origin of the rectangular coordinate system by an angle $\alpha_1$ is as follows:

$$\begin{cases} x_{01} = x_{n0}\cos\alpha_1 - y_{n0}\sin\alpha_1 \\ y_{01} = x_{n0}\sin\alpha_1 + y_{n0}\cos\alpha_1 \end{cases} (n=1,2,3,4,5,6)$$

wherein $x_{01}$ and $y_{01}$ are x-axis and y-axis coordinate values of the normal tooth profile curve of the cylindrical gear I with a constructed tooth pair in the rectangular coordinate system, respectively.

17. The external meshing cylindrical gear pair with a constant meshing characteristics constructed tooth pair according to claim 7, wherein a curve equation of the normal tooth profile curve $\Gamma_{s1}$ of the cylindrical gear I with a constructed tooth pair obtained by rotating the continuous combined curve $\Gamma_L$ around an origin of the rectangular coordinate system by an angle $\alpha_1$ is as follows:

$$\begin{cases} x_{01} = x_{n0}\cos\alpha_1 - y_{n0}\sin\alpha_1 \\ y_{01} = x_{n0}\sin\alpha_1 + y_{n0}\cos\alpha_1 \end{cases} (n=1,2,3,4,5,6)$$

wherein $x_{01}$ and $y_{01}$ are x-axis and y-axis coordinate values of the normal tooth profile curve of the cylindrical gear I with a constructed tooth pair in the rectangular coordinate system, respectively.

18. The external meshing cylindrical gear pair with a constant meshing characteristics constructed tooth pair according to claim 13, wherein a curve equation of the normal tooth profile curve $\Gamma_{s2}$ of the cylindrical gear II with a constructed tooth pair obtained by rotating the normal tooth profile curve $\Gamma_{s1}$ of the cylindrical gear I with a constructed tooth pair around the origin of the rectangular coordinate system by an angle of 180° is as follows:

$$\begin{cases} x_{02} = x_{01}\cos(180°) - y_{01}\sin(180°) \\ y_{02} = x_{01}\sin(180°) + y_{01}\cos(180°) \end{cases}$$

wherein $x_{02}$ and $y_{02}$ are x-axis and y-axis coordinate values of the normal tooth profile curve of the cylindrical gear II with a constructed tooth pair in the rectangular coordinate system, respectively.

19. The external meshing cylindrical gear pair with a constant meshing characteristics constructed tooth pair according to claim 14, wherein a curve equation of the normal tooth profile curve $\Gamma_{s2}$ of the cylindrical gear II with a constructed tooth pair obtained by rotating the normal tooth profile curve $\Gamma_{s1}$ of the cylindrical gear I with a constructed tooth pair around the origin of the rectangular coordinate system by an angle of 180° is as follows:

$$\begin{cases} x_{02} = x_{01}\cos(180°) - y_{01}\sin(180°) \\ y_{02} = x_{01}\sin(180°) + y_{01}\cos(180°) \end{cases}$$

wherein $x_{02}$ and $y_{02}$ are x-axis and y-axis coordinate values of the normal tooth profile curve of the cylindrical gear II with a constructed tooth pair in the rectangular coordinate system, respectively.

20. The external meshing cylindrical gear pair with a constant meshing characteristics constructed tooth pair according to claim 15, wherein a curve equation of the normal tooth profile curve $\Gamma_{s2}$ of the cylindrical gear II with a constructed tooth pair obtained by rotating the normal tooth profile curve $\Gamma_{s1}$ of the cylindrical gear I with a constructed tooth pair around the origin of the rectangular coordinate system by an angle of 180° is as follows:

$$\begin{cases} x_{02} = x_{01}\cos(180°) - y_{01}\sin(180°) \\ y_{01} = x_{01}\sin(180°) + y_{01}\cos(180°) \end{cases}$$

wherein $x_{02}$ and $y_{02}$ are x-axis and y-axis coordinate values of the normal tooth profile curve of the cylindrical gear II with a constructed tooth pair in the rectangular coordinate system, respectively.

* * * * *